United States Patent [19]
Van Puuenbroek et al.

[11] Patent Number: 6,112,091
[45] Date of Patent: Aug. 29, 2000

[54] METHOD OF ESTIMATING SYSTEM REQUIREMENTS OF A CELLULAR RADIO TELECOMMUNICATION NETWORK USING TOPOGRAPHICAL DATAS

[75] Inventors: Cornelis Adrianus Henricus Maria Van Puuenbroek; Jan Arie Van Houwelingen, both of Enschede, Netherlands; Sten Erik Blomstergren, Täby, Sweden; Frank Bastiaan Brouwer, Enschede, Netherlands

[73] Assignee: Telefonaktiebolaget LM Ericsson, Stockholm, Sweden

[21] Appl. No.: 08/952,005

[22] PCT Filed: May 9, 1996

[86] PCT No.: PCT/EP96/01977

§ 371 Date: Nov. 7, 1997

§ 102(e) Date: Nov. 7, 1997

[87] PCT Pub. No.: WO96/36188

PCT Pub. Date: Nov. 14, 1996

[30] Foreign Application Priority Data

May 9, 1995 [EP] European Pat. Off. .............. 95201209

[51] Int. Cl.$^7$ .................................................. H04Q 7/20
[52] U.S. Cl. ........................ 455/446; 455/426; 455/11.1
[58] Field of Search .................. 455/446, 67.1, 455/11.1, 423, 424, 445, 554, 555, 426

[56] References Cited

U.S. PATENT DOCUMENTS

| | | | |
|---|---|---|---|
| 5,265,150 | 11/1993 | Helmkamp et al. | 455/11.1 |
| 5,544,227 | 8/1996 | Blust et al. | 455/554 |
| 5,911,123 | 6/1999 | Shaffer et al. | 455/554 |

FOREIGN PATENT DOCUMENTS

| | | |
|---|---|---|
| 0 559 949A2 | 9/1993 | European Pat. Off. . |
| 0 624 961A1 | 11/1994 | European Pat. Off. . |
| 90/10342 | 9/1990 | WIPO . |
| 94/19877 | 9/1994 | WIPO . |
| 95/04509 | 2/1995 | WIPO . |
| 96/15642 | 5/1996 | WIPO . |

*Primary Examiner*—Nguyen Vo
*Assistant Examiner*—Darnell R. Armstrong
*Attorney, Agent, or Firm*—Burns, Doane, Swecker & Mathis, L.L.P.

[57] ABSTRACT

The invention relates to a method of and a device for estimating system requirements of a radio telecommunication network (1). In a first step the area of interest is split in geographical regions with regard to their structural environment. In a next step each region is split in homogeneous zones with regard to such parameters as the height of the structures, their height variation, the distribution of the height variation and the type of vegetation. Each zone is further classified with regard to the typical building materials used and information of the system deployment conditions. From the area of each zone a preliminary number of radio access units (2) is calculated using its classification data and the range of the radio access unit (2) in such a zone. Thereafter the number of radio access units (2) of a zone or a group of like zones is examined with respect to the communication capacity required. The structural information and data necessary for carrying out the invention can be provided by persons having no special radio knowledge.

12 Claims, 1 Drawing Sheet

METHOD OF ESTIMATING SYSTEM REQUIREMENTS OF A CELLULAR RADIO TELECOMMUNICATION NETWORK USING TOPOGRAPHICAL DATAS

FIELD OF THE INVENTION

The present invention relates generally to telecommunication systems comprising a radio link connection between two or more telecommunication units and, more specifically, to telecommunication systems having a plurality of geographically spread fixed and/or mobile radio telecommunication units. The invention provides a method of estimating system requirements of such telecommunication systems, in particular of so-called Radio in the Local Loop (RLL) or Wireless in the Local Loop (WLL) telecommunication networks.

BACKGROUND OF THE INVENTION

In conventional Public Switch Telephone Networks (PSTN) and Integrated Services Digital Networks (ISDN), for example, up till now the overwhelming majority of residential and office subscribers have a wired connection from the subscriber premises to a public local exchange. These subscriber connections, which may run via an intermediate concentrator, are referred to as the local loop.

The installation of such wired links all the way down to the subscriber premises is both time consuming and involves substantial networking costs, apart from troubles caused by the interruption of streets and pavements. Therefore, there is a growing interest in replacing the wired local loop by a so-called wireless local loop, i.e. using radio technology as an alternative for or as a replacement of the copper wires down to the subscriber premises. This is not only of interest for the present network operators in case of expansion or renovation of the existing public telecommunication network but, in particular, for new operators which would like to provide competitive public telecommunication services, such as a public telephone service. The concept of wireless public subscriber connections is called RLL or WLL.

Within the concept of RLL, two basic systems can be distinguished: Fixed RLL (FRLL) and Mobile RLL (MRLL). In the FRLL system, the subscriber is provided with an ordinary telephone socket, however connected to a radio transceiver, also called Fixed Access Unit (FAU) or Wireless Fixed Access Unit (WFAU). Via this FAU/WFAU a radio link is established with a so-called base station or radio access unit, which provides access to the PSTN/ISDN. In the MRLL concept, the subscriber is provided with a portable cordless or mobile radio telephone handset, by which, via the radio access unit access to the PSTN/ISDN can be established.

Mixed concepts are also possible, i.e. FRLL providing mobility in the subscriber premises, also called Cordless In The Home (CITH) and residential or neighborhood mobility, also called Cordless In The Neighborhood (CITN). In some countries, governmental regulations prevent the established telephone operators from offering local mobility in the present PSTN/ISDN. In such cases, it is very attractive for a second or third operator to offer both fixed and mobile or cordless access to the PSTN/ISDN.

The advantages of wireless local loop connections in the PSTN/ISDN network are numerous, ranging from short installation times, increased flexibility and improved operation and maintenance of the network to the opportunity of providing local subscriber mobility to the PSTN/ISDN.

International Patent Application WO 94/19877 discloses an RLL system based on existing business cordless technology, such as designated CT2, CT3 and Digital Enhanced Cordless Telecommunications (DECT). These cordless communication systems have been developed for use in picocells (having a range from the radio access unit to the cell boundary of a few meters), nanocells (up to 10 m) and microcells (10 to 400 m for pedestrians and 300 m to 2 km for vehicles).

The non-prepublished International Patent Application PCT/EP95/04509 discloses an RLL system comprising a number of geographically spread radio access units or radio access units based on the above cordless communication techniques, in particular DECT, providing coverage in sectors for use in minicells (500 m to 3 km) and macrocells (up to 5 km).

Other types of communication systems having wired connections to a PSTN/ISDN are the well-known cellular mobile telephone and data transmission systems. A typical cellular mobile communication system comprises mobile radio subscriber units, a plurality of radio base stations, each providing service to a geographical area or cell, and radio exchanges or mobile telephone switching offices (MTSO) to which a number of base stations are connected. The MTSO are, in turn, coupled to a PSTN/ISDN for completing transmissions, such as telephone calls, between mobile radio subscribers and landline subscribers.

Analogue cellular systems, such as designated AMPS, ETACS, NMT-450 and NMT-900 have been deployed throughout the world. Digital cellular systems are designated IS54B in North America and the pan-European GSM system. These systems, and others, are described, for example, in the book titled "Cellular Radio Systems", by Balston et al., published by Artech House, Norwood, Mass., 1993.

First generation cellular mobile networks provide service to macrocells, and large cells (5 to 35 km), with some satellite cells (>500 km). An important problem in wireless cellular communication is to provide full coverage cost effectively. This has lead to the splitting of cells in dense traffic areas, adding microcells and minicells overlaid by a macrocell structure. The overlaying macrocells serve low-traffic areas and cell crossings by mobile subscribers.

Future cellular mobile networks will also have picocells and nanocells often in clusters of street microcells, with each cluster overlaid by a macrocell. In a typical cell overlay configuration, each microcell has its own base station providing service to the corresponding cell, whereas the several base stations are wired to a concentrator or access unit which is, in turn, coupled to a MTSO.

There are various tools available for the planning of radio communication networks. In the case of present cellular systems, the main problem to be solved is the efficient use of limited frequency or communication channel resources. Reference is made, inter alia, to International Patent Application WO 90/10342 and European Patent Application 0,559,949. These known planning tools require, however, detailed geographical information on the coverage region and/or signal strength, coverage and interference measurements.

Different from the present cellular radio communication systems, in cordless systems such as DECT frequency planning is not an essential issue. DECT is a low power, high capacity Multi Carrier/Time Division Multiple Access/Time Division Duplex (MC/TDMA/TDD) digital radio access technique, providing ten radio carriers, each divided into 24 time-slots which serve 12 duplex communication channels, called a frame. The communication channels are continuously adaptively selected. A communication channel, when occupied, is individual to a radio link connection between the base station and a particular remote telecommunication unit. This type of access technique is known as Continuous Dynamic Channel Allocation (CDCA).

However, due to the relatively low transmission power of the cordless equipment, compared to the present cellular systems, cost effective coverage planning is an important issue for cordless telecommunication systems.

European Patent Application 0,624,961 discloses a method for the planning of cordless telephone systems in indoor environments, such as offices, production halls etc. This method relates to the calculation of the number of base stations required for providing a required grade of service. The method is, however, not quite suitable for use in telecommunication systems operating in outdoor environments such as RLL or WLL communication networks.

An essential requirement for RLL or WLL network systems, for example, is to enable installations which are economic as to capacity and power. That is to say, the various components of the system have to be designed such that an optimum between geographical coverage, range, communication capacity and installation costs can be achieved, in order to provide competitive wireless connections.

Accordingly, there is a need for a planning tool to provide an estimate on the system requirements which allows a potential operator and/or a system manufacturer to calculate in advance is system costs. This, however, without the need for detailed information of the geographic configuration of the area of interest, e.g. in the form of a blueprint or topographic chart, satellite observations, or specialist knowledge for providing field strength measurements and the like.

SUMMARY OF THE INVENTION

It is an object of the present invention to provide a method of estimating system requirements of a radio telecommunication network, in particular an RLL or WLL communication network.

It is in particular an object of the present invention to calculate this estimate from information provided by a layman, i.e. a person which does not necessarily has to have special radio knowledge or information based on radio measurements.

The invention provides a method of estimating system requirements of a radio telecommunication network for installation in an area of interest by processing environmental or geographic data, system deployment data and data regarding the required grade of service or grade of coverage using computer means comprising processing means, input/output means and memory means performing the steps of:
  splitting the area of interest in geographical regions with regard to their structural environment;
  splitting each said region in homogeneous zones with regard to:
    the height of the structures;
    their height variation;
    the distribution of the height variation;
    the type of vegetation;
  establishing the area of each zone or a group of like zones;
  classifying each zone or a group of like zones with regard to the typical building materials used;
  processing for each zone or a group of like zones information with regard to system deployment conditions;
  calculating for each zone or a group of like zones the number of radio access units from the data established and the range of a radio access unit in such a zone, and
  examining the number of radio access units of a zone or a group of like zones with regard to the communication capacity required.

The invention essentially consists in collecting and processing environmental or geographic data, system deployment data and data regarding the required grade of service or grade of coverage.

The environmental or geographical data can be provided by a person having no specialist radio knowledge or, alternatively, can be retrieved from charts, maps or by watching a video film of the area of interest, i.e. the service area of the radio communication network. No exactly correct data are required. An estimation, most likely by visual inspection, suffices. This is an advantage of the present method, because for large areas it is quite expensive both in terms of effort and costs to establish precise information as to environmental parameters. With the present method, by inputting estimated average values a result close to the actual situation can be obtained.

System deployment data and data with regard to the required grade of service have to be provided by the potential operator of the system and/or the manufacturer. Alternatively, a case study for several different deployment situations can be established. This to provide an operator with an optimum cost effective solution, for example.

It is presupposed that the knowledge about the range of the radio access units in the several types of zones is available and stored in a database or other suitable medium allowing access by a personal computer or the like. This information can be obtained from empirical data, measured data or data calculated from known propagation models.

Further embodiments of the method according to the invention are specified in the appended claims, which also relate to a device for estimating system requirements of a radio telecommunication network.

The invention will now be described in more detail with reference to the appended drawing.

DETAILED DESCRIPTION OF THE EMBODIMENTS

Figure 1:
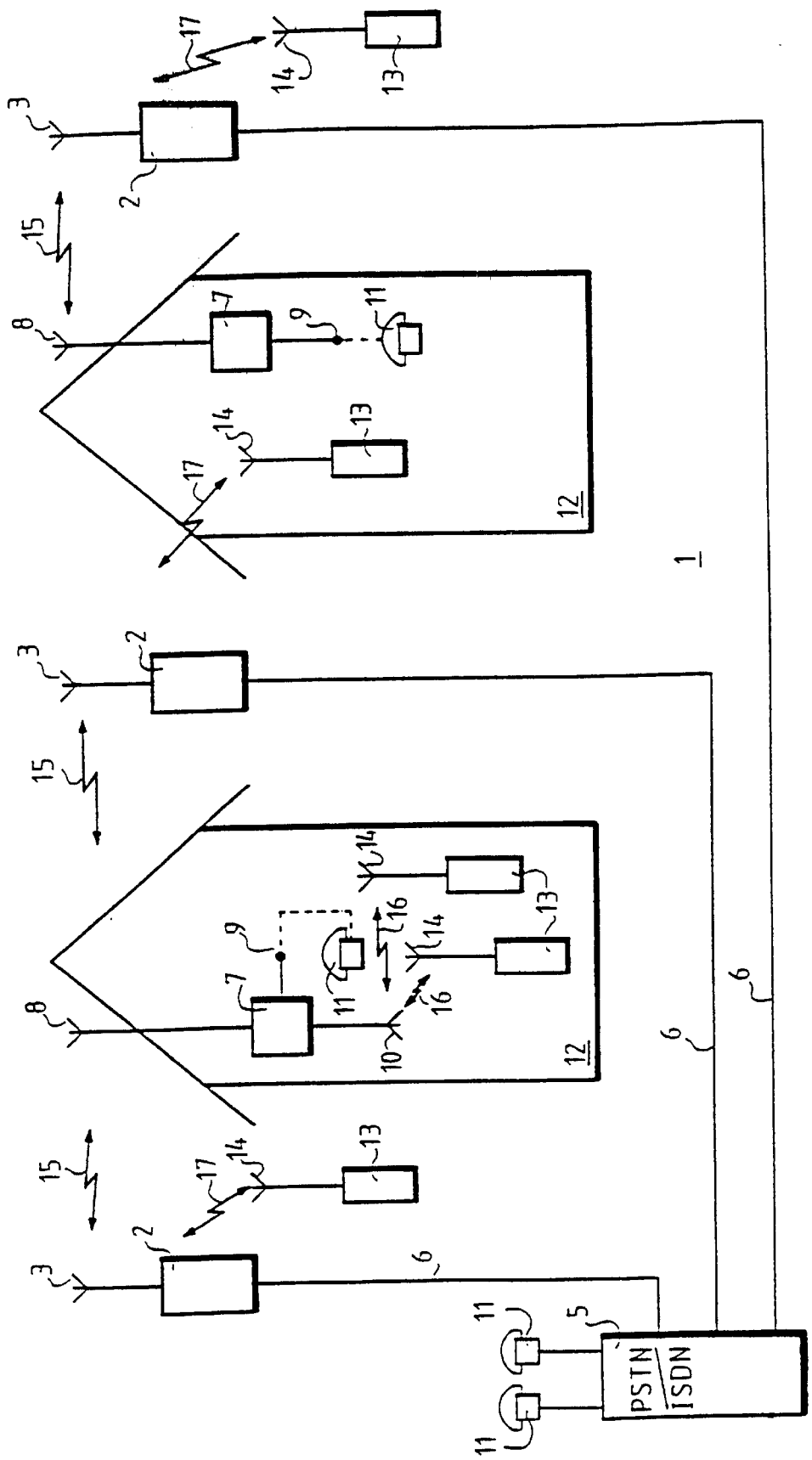
FIG. 1 shows, in a very schematic manner, a prior art RLL system providing both FRLL and MRLL.

Without the intention of a limitation, the invention will now be described and illustrated with reference to an exemplary embodiment of an RLL or WLL telecommunication system.

FIG. 1 shows an example of an RLL or WLL telecommunication system providing fixed (FRLL) and mobile (MRLL) access, such as disclosed by International Patent Application WO 94/19877 and the non-prepublished International Patent Application PCT/EP95/04509. The system is generally designated by reference numeral 1 and comprises a plurality of radio access units 2, each comprising of at least one so-called radio base station having a radio transceiver unit, the transceiver output of which is connected to at least one receive/transmit antenna 3. The radio access units 2 are further coupled to an exchange or switch 5, for connection to a public telephone and/or data network (PSTN/ISDN). Although the connections to the exchange 5 are shown in the form of a cable 6, i.e. a copper wire or an optical fibre, this may be also a microwave radio link, for example.

The system further comprises a number of remote wireless fixed access units (W)FAU 7, comprising a radio transceiver unit connected to a receive/transmit antenna 8, for establishing a radio communication link 15 with a radio access unit 2. The remote units 7 comprise either one or both a telephone terminal 9, for connecting an ordinary wire-type telephone 11 and a further receive/transmit antenna 10. As illustrated, the remote units 7 are fixedly installed in (or at) a building 12, such as a house or the like. The antenna 8 may be an indoor or outdoor antenna, preferably a long range antenna, whereas the further antenna 10 is generally an omnidirectional indoor antenna.

Besides fixedly installed remote units 7, the system comprises also several mobile remote units 13, in the form of telephone handsets, for example. These mobile remote units 13 each comprise a transceiver unit, one end of which is connected to a receive/transmit antenna 14 and another end of which is connected to a microphone/loudspeaker arrangement for voice communication, for example. As illustrated, these mobile remote units 13 can be used inside the building 12, to establish a radio link 16 with the fixed remote units 7, via the indoor antenna 10 and the mobile antenna 14, or for establishing a direct radio link 17 with a radio access unit 2, via their respective antennas 3 and 14.

In case of radio access units 2 operating in accordance with the existing low power cordless technologies such as designated CT2, CT3 and DECT, each of these radio access units covers a limited area having the size of a pico-, nano-, micro- or minicell. Accordingly, a large number of such radio access units 2 have to be installed and connected to the exchange 5 in order to cover extensive residential, metropolitan or urban regions, for example.

The first step according to the method of the invention is to split the area of interest, i.e. the coverage area of the RLL or WLL network, in structural geographical regions. This mainly following a social geographic classification scheme such as metropolitan, urban, sub-urban or residential and rural regions. Such a division can be generally made from public available data. It will be understood that from such a classification already a first indication about the high, medium and low traffic density regions is obtained.

In the context of the present invention, a metropolitan area is best characterized by streets lined with huge buildings of several floors each. Rows of huge buildings provide a risk of long path delays. Central parts of a large cities such as Frankfurt and London are typical examples.

For the purpose of the present invention, urban regions are best classified as a mixture of high rise and low rise buildings, the latter ones typically 5–10 stories high. Little vegetation is present between the buildings. Typical examples can be found in the central parts of major cities.

An environment comprising relatively low rise buildings, typically 1–3 stories high, and having an amount of vegetation between the buildings which can be regarded as moderate, mainly consisting of gardens and parks, is in the present invention classified as sub-urban or residential. The height of the vegetation may be in the order of or even above the height of the buildings. Typical examples of this type of regions can be found in suburbs.

The classification rural is given to environments characterized by scattered low rise buildings, scattered groups of trees and of which the major part consists of open land or field.

A further step involves a more detailed classification of the regions with regard to their structure, in particular the height of the buildings, the variation in the heights, the distribution of the buildings with regard to their height i.e. the distribution or occurrence of the height variation and the type of vegetation. This all in a manner such that with regard to these parameters several homogeneous zones are obtained.

Such a classification can be provided by a person having no specific knowledge about radio or telecommunication networks. In most of the above mentioned regions zones having a concentration of high buildings, such as apartments or offices, and zones having mainly buildings of a lower height such as single family homes and the like can be distinguished. In particular in case of a mixture of high and low buildings, additional information on the variation in the heights and the distribution of the height variations is required. With the latter is meant information with regard to the distribution of the high, medium and low buildings over a zone. That is to say, clusters of high buildings or alternatively high buildings adjacent to lower buildings.

Dependent on the accuracy required, the height information can be classified according to a height scheme, e.g. buildings having an average height lower than 3 m, buildings having an average height between 3 and 5 m, between 5 and 10 m etc. This applies also with respect to height variations in a zone, and the distribution of the height variation. The average height should be estimated with an accuracy of a few meters. It will be understood that the homogeneity of the zones will increase by having more elaborated classification schemes. Once the zones have been structurally classified, their surface area has to be established.

For an accurate estimate of the system requirements in terms of radio access units, information with respect to the vegetation and the density of the structures and the vegetation in the zones is required. The vegetation can be again classified in accordance with a scheme of heights, height variations and distribution of the height variations. Important with vegetation is to gather information as to whether the vegetation is higher or lower than the average building height. In the case of a higher vegetation it is important to know how much higher the vegetation is compared to the building height.

A very important factor which determines the range of a radio access unit 2 in a particular zone when a subscriber access unit (W)FAU 7 is installed indoor, is provided by the degree of penetration of radio waves of the structures. By using known equations and data, the degree of penetration or the penetration loss for a certain frequency can be easily determined from a classification of the typical building materials according to their typical construction materials. A possible classification scheme for a layman may involve: structures from concrete, stone and like materials; wood and like materials; glass and like materials; metal and like materials.

The range of a radio access units is further dependent on the manner in which the system is deployed. With reference to FIG. 1, important parameters are: indoor/outdoor mounted subscriber access units 7; rooftop or ground level mounted subscriber access units 7; mast or rooftop mounted radio access units 2; system parameters such as link power budget. The link power budget is, inter alia, determined by the type of antennas 3, 8 used for establishing the radio link between a radio access unit 2 and a subscriber access unit 7 (FAU or WFAU), e.g. long range directional antennas or short range omni-directional antennas 3, 8. It will be appreciated that in case of mast mounted radio access units 2 and rooftop mounted subscriber access units 7, a larger area can be covered by a particular radio access unit 2 compared to ground level mounted subscriber access units 7 and a rooftop mounted radio access unit 2, for example.

It is possible that, due to regulatory conditions, only radio access units are allowed having a maximum range. Of course the system itself has also limitations as to its maximum range due to propagation conditions, dispersion etc.

By having a database or other suitable computer accessible medium carrying information as to the range of a radio access unit operating in the type of zones specified or identified above, a preliminary number of radio access units can be easily calculated from the surface area of a zone and the coverage area of a radio access unit in this zone. However, by summing up all the numbers calculated no reliable estimate of the system costs can be provided yet.

To achieve this, the number of radio access units for a zone or a group of like zones has to be examined with regard to the required communication capacity and the capacity provided by a each radio access units. As mentioned before, for DECT their will be hardly any problem as to the capacity requirements.

Further, a potential operator may decide not to cover a whole region or an area or not even all the subscribers in a zone. The required number of radio access units can now be calculated by correcting the above preliminary number of radio access unit in dependence of the defined grade of service or grade of coverage and the required communication capacity. A further correction can be applied by the fact that in a multi cell environment, the range of a radio access unit can up to 10% greater than for a single cell configuration.

The invention provides a method of estimating the system requirements and costs in terms of the number of radio access units of a telecommunication network based on easy to determine data, which method can be provided in the form of a computer program running on a personal computer comprising processing means, input/output means and memory means, arranged to calculate and process data according to the method of the invention.

In a preferred embodiment of the method according to the invention, the main calculations for a zone are based on the COST 231 Walfisch-Ikegami propagation model.

The first step in this calculation is to determine the probability of Line Of Sight (LOS) and Non Line Of Sight (NLOS) which will be used in the propagation model. In order to calculate these probabilities, according to the present invention a number of intermediate calculations are made:

Calculation of the average building height:

$$Hb = \frac{3*Hm + Hh}{4}$$

wherein:

Hb=Average building height (m)

Hm=Building height of middle 60% of the buildings (m)

Hh=Building height of higher 20% of the buildings (m).

Calculation of the average height of obstacles:

$$Ho = \begin{array}{ll} Hb & \text{if } Ht < Hb \\ Hb + (Ht - Hb)*\frac{Dt-1}{5} & \text{if } Ht > Hb \end{array}$$

wherein:

Ht=Average height of trees/foliage (m)

Dt=Tree/foliage density.

Calculation of the average height above ground level of the subscriber access unit (FAU) for buildings:

$$Hf = \begin{array}{ll} \frac{Hm - Hh}{2} & \text{if } FAU \text{ placed at rooftop} \\ \frac{Hm + Hh}{4} & \text{if } FAU \text{ placed at apartment} \end{array}$$

wherein:

Hf=Average height above ground level of a subscriber access unit FAU (m).

The effect on LOS of the average building height relative to the average FAU height is calculated from:

$$Eb = cnorm(Hf - Ho)$$

wherein:

Eb=Building height effect cnorm=Cumulative normal distribution.

The effect on LOS of the tree height and tree density relative to the average height of a subscriober access unit (FAU) is calculated from:

$$Et = 1 - \frac{Dt-1}{5} * cnom(2*(Ht - Hf))$$

wherein:

Et=Tree height effect.

The probabilities having LOS and NLOS are calculated from:

$$Plos = Eb*Et$$

$$Pnlos = 1 - Plos$$

wherein:

Plos=Probability having LOS

Pnlos=Probability having NLOS.

Next the probability of coverage for variable distance is calculated. The functions given in Function 1 and Function 2 below are used. These functions are derived from the COST 231 Walfisch-Ikegami model. However, two major deviations from this model are applied; i.e. information on street orientation is not used and it is assumed that a log-normal distribution can be laid over the calculated loss.

```
Function 1:
Function LOS(d, f, lb, div, pl, hvar)
    'd: distance
    'f: frequency
    'lb: link budget
    'div: diversity applied
    'pl: penetration loss
    'hvar: height variation
        'Diversity margin
        If div Then
            'Diversity applied
            mdiv = 3.5
        Else
            'No diversity
            mdiv = 7
        End If
        'Shadowing standard deviation assumes hvar to be between 1 and 3
        smin = 3
        smax = 8
        sigma = smin + (smax - smin) * (hvar - 1)/2
        'Loss calculation
        loss = 24.6 + 20 * Log10(f) + 26 * Log10(d) + pl
        t = (lb - loss - mdiv)/sigma
        LOS = Normal(t)
End Function
```

The term diversity relates to the so-called space or switch antenna diversity feature of the radio access units which, to this end, have to be provided with two spaced apart antennas. If a radio channel provides bad communication, the control logic of the radio access units first tries to improve the link on a particular channel by using the other one of the antennas before changing the radio communication channel.

Function 2:
Function NLOS(d, f, lb, div, pl, hvar, dr, dh, hD, hr, hF, env)
'd: distance
'f: frequency
'lb: link budget
'div: diversity applied
'pl: penetration loss
'hvar: height variation
'dr: average distance between rooftops
'dh: average distance between houses
'hD: average height of radio access units
'hr: average height of rooftops
'hF: average height of FAU
'env: environment type
    'Diversity margin
    If div Then
        'Diversity applied
        mdiv = 4.5
      Else
        'No diversity
        mdiv = 8.5
    End If
    'Shadowing standard deviation assumes hvar to be between 1 and 3
    smin = 4
    smax = 10
    sigma = smin + (smax - smin) * (hvar - 1)/2
    'Loss calculation
'Free space
fsl = 32.4 + 20 * Log10(f) + 20 * Log10(d)
hDr = hD - hr
hrF = hr - hF
'Roof to street diffraction and scatter loss
If hrF < 1 Then
    rtsF = 0
      Else
    rtsF = 20 * Log10(hrF)
End If
rts = 13.1 - 10 * Log10(dh) + 10 * Log10(f) + rtsF
'Multi screen diffraction loss
If hpr > 0 Then
    bsh = -18 * Log10(1 + hDr)
    Ka = 54
    Kd = 18
      Else
    bsh = 0
    If d < 500 Then
        Ka = 54 - 0.8 * hDr * d/500
          Else
        Ka = 54 - 0.8 * hDr
    End If
    Kd = 18 - 15 * hDr/hr
End If
Kf = -4 + (2.3 - 0.8 * env) * (f/0.925 - 1)
msd = bsh + Ka + Kd * Log10(d/1000) + Kf * Log10(f * 1000) - 9*Log10(dr)
tl = rts + msd
If tl > 0 Then
    loss = fsl + tl + pl
      Else
    loss = fsl + pl
End If
    t = (lb - loss - mdiv) / sigma
    NLOS = Normal(t)
End Function The probability of coverage at a distance d is than calculated from:

$$P(d) = F * (P_{los,f} * LOS_f(d) + (1 - P_{los,f}) * NLOS_f(d)) + A * (P_{los,a} * LOS_a(d) + (1 - P_{los,a}) * NLOS_a(d))$$

wherein:
P(d)=Probability of coverage at distance d
F=Fraction of users in family house
A=Fraction of users in apartment=1−F
$P_{los,f}$=Probability of Line Of Sight for family house
$P_{los,a}$=Probability of Non Line Of Sight for apartment
$LOS_f(d)$=Coverage probability for LOS family house at distance d
$NLOS_f(d)$=Coverage probability for NLOS family house at distance d
$LOS_a(d)$=Coverage probability for LOS apartment at distance d
$NLOS_a(d)$=Coverage probability for NLOS apartment at distance d Next, the required number of radio access units for coverage is calculated. The achievable range is calculated by seeking the distance that matches the probability of coverage (subscriber access units installed without usage of additional measures). For the inner cell range, the probability is squared. The inner cell range is the range covered by a radio access unit positioned in a particular cell. As will be appreciated by those skilled in the art, in the case of (partially) overlapping cells a certain area will be covered by both the inner cell radio access unit and a neighbouring or border cell radio access unit.

Using the resulting ranges, the required number of radio access units is calculated. It is assumed that if a number of Ncov radio access units are positioned in an area, the covered area is equal to:

$$At = Ncov * Ai + \left(\sqrt{3n - 0.75} - 0.5\right) * Ab$$

wherein:
At=Total area covered
Ai=Area covered by an inner cell access unit
Ab=Area covered by a border cell access unit
Ncov=Number of radio access units.

The required number of radio access units Ncov is found by seeking an Ncov that matches the given coverage area.

The number of radio access units required to address or service the number of subscriber access units in the area is the smallest integer larger than the division of the total number of subscriber access units in the area by the number of subscriber access units which can be serviced by one radio access unit, i.e.:

$$Nfau = \left\lfloor \frac{A * DF}{MF} \right\rfloor$$

wherein:
Nfau=Number of radio access units required to service the number of subscriber access units
A=Total area to be covered
DF=FAU density
MF=Maximum number of subscriber access units per radio access unit.

The number of radio access units required to address the traffic capacity is calculated by first calculating the traffic in the area:

$$Tt = A*DF*Tf*(1+Pfax*Ffax)$$

wherein:
Tt=Total offered traffic in the area
A=Total area to be covered
DF=subscriber access unit density
Tf=Offered traffic per subscriber access unit (FAU)
Pfax=Fax penetration
Ffax=Fax factor, a factor that identifies the extra load due to fax usage.

Next, the number of radio access units is calculated to service or address this traffic. In this calculation two types of radio access units are considered, i.e. basic and full radio access units. This is based on the fact that a single radio access unit may comprise a number of radio base stations. The so-called basic version comprises less base stations than the full version. In general, the basic version comprises halve of the number of base station compared to a full version. Reference is made to the above identified International Patent Application PCT/EP95/04509.

$$Ncap_{basic} = \frac{Tt}{Cap_{basic}(GOS)}$$

$$Ncap_{full} = \frac{Tt}{Cap_{full}(GOS)}$$

wherein:
Ncap=Number of radio access units required to service the capacity
$Cap_{basic}$=Capacity of a basic radio access unit
$Cap_{full}$=Capacity of a full radio access unit
GOS=Required Grade Of Service.

Eventually, the required number of radio access units is the maximum of the three previous values, Ncov, Nfau, Ncap. When it is allowed to use basic radio access units, it is checked whether $Ncap_{basic}$ is smaller or equal to the required number of radio access units.

What is claimed is:

1. A method of estimating system requirements of a radio telecommunication network for installation in an area of interest by processing environmental and geographic data, system deployment data and data regarding the required grade of service and grade of coverage using computer means comprising processing means, input/output means and memory means performing the steps of:
    splitting the area of interest in geographical regions with regard to their structural environment;
    splitting each said geographical region in zones with regard to:
        height of structures in a zone;
        height variation of the structures;
        distribution of the height variation;
        type of vegetation;
    establishing of each zone its surface area;
    classifying each zone with regard to typical building materials used;
    processing of each zone information with regard to system deployment conditions;
    calculating for each zone a required number of radio access units from data established in the previous steps and transmission range data of a radio access unit in such a zone, and
    examining the number of radio access units of a zone with regard to a communication capacity required.

2. A method according to claim 1, wherein the area of interest is split according to a scheme of urban or metropolitan, sub-urban or residential and rural regions.

3. A method according to claim 1, wherein said zones are classified according to a scheme of heights of the structures, a scheme of height variations, and a distribution scheme of the height variations.

4. A method according to claim 1, wherein density data of the structures in a zone is processed.

5. A method according to claim 1, wherein the type of vegetation in a zone is classified according to a scheme of heights of the vegetation, a scheme of height variations, a distribution scheme of the height variations and density data of said vegetation.

6. A method according to claim 1, wherein the building materials of the structures in a zone are classified with regard to their grade of radio wave penetration following a classification of typical construction materials:
    concrete, stone;
    wood;

glass;

metal.

7. A method according to claim 1, wherein the information with regard to the system deployment conditions comprises:

maximum allowable cell size or coverage area of a radio access unit;

indoor/outdoor mounted subscriber access units;

rooftop/ground level mounted subscriber access units;

mast/rooftop mounted radio access units;

system parameters including link power budget.

8. A method according to claim 1, wherein the transmission range of a radio access unit in a zone is calculated from the data established and data previously stored in a data base medium accessible by a personal computer.

9. A method according to claim 1, wherein the number of radio access units of a zone is calculated from the ratio of the surface area of said one and coverage area of a radio access unit in said zone.

10. A method according to claim 9, wherein the number of radio access units is examined with regard to the required communication capacity and additional coverage provided by adjacent radio access units.

11. A method according to claim 1, wherein the processing of data with respect to a zone is performed for a group of like zones.

12. A device for estimating system requirements of a radio telecommunication network, comprising processing means, input/output means and memory means, said processing means being arranged to process environmental and geographic data, system deployment data and data regarding the required grade of service and grade of coverage by performing the steps of:

splitting the area of interest in geographical regions with regard to their structural environment;

splitting each said geographical region in zones with regard to:

height of structures in a zone;

height variation of the structures;

distribution of the height variation;

type of vegetation;

establishing of each zone its surface area;

classifying each zone with regard to typical building materials used;

processing of each zone information with regard to system deployment conditions;

calculating for each zone a required number of radio access units from data established in the previous steps and transmission range data of a radio access unit in such a zone, and examining the number of radio access units of a zone with regard to a communication capacity required.

\* \* \* \* \*

UNITED STATES PATENT AND TRADEMARK OFFICE
CERTIFICATE OF CORRECTION

PATENT NO. : 6,112,091
DATED : August 29, 2000
INVENTOR(S) : Cornelis VAN PUIJENBROEK, et al.

It is certified that error appears in the above-identified patent and that said Letters Patent is hereby corrected as shown below:

On the cover sheet of the patent, please change the last name of the first-listed inventor from "Van Puuenbroek" to - - Van Puijenbroek- -.

Signed and Sealed this

Fifteenth Day of May, 2001

Attest:

NICHOLAS P. GODICI

Attesting Officer

Acting Director of the United States Patent and Trademark Office